United States Patent [19]

Mühlbauer

[11] Patent Number: 5,506,281
[45] Date of Patent: Apr. 9, 1996

[54] COPOLYMER OF THE TETRAFLUOROETHYLENE-ETHYLENE TYPE HAVING A CORE-SHELL PARTICLE STRUCTURE

[75] Inventor: Hans P. Mühlbauer, Feldafing, Germany

[73] Assignee: Hoechst Aktiengesellschaft, Germany

[21] Appl. No.: 500,258

[22] Filed: Jul. 10, 1995

[30] Foreign Application Priority Data

Jul. 12, 1994 [DE] Germany ............... 44 24 466.5

[51] Int. Cl.⁶ .................................................. C08F 259/00
[52] U.S. Cl. .................................. 523/201; 525/902
[58] Field of Search .......................... 523/201; 525/902

[56] References Cited

U.S. PATENT DOCUMENTS 2,400,091  5/1946  Alfthan ........................ 18/47.5
4,469,846  9/1984  Khan et al. ..................... 525/72
5,296,165  3/1994  Shimizu et al. ................. 252/311

FOREIGN PATENT DOCUMENTS 54-158465  6/1978  Japan.
2168981    7/1986  United Kingdom.

*Primary Examiner*—Edward Cain
*Attorney, Agent, or Firm*—Connolly & Hutz

[57] ABSTRACT

Aqueous dispersions of colloidal particles comprising a particle core and at least one particle shell are obtained by preparing a seed dispersion by copolymerization of tetrafluoroethylene, ethylene and, if desired, further fluoroolefinic comonomers and then continuing the polymerization by supplying the monomers for the particle shell, where the particle shell is a polymer having a melting point at least 20° C. lower than that of the particle core, and where the volume of the particle shell is from 1 to 26% by volume of the total volume. These dispersions can be coagulated or spray dried to give powders which are suitable for the production of porous structures.

11 Claims, No Drawings

COPOLYMER OF THE TETRAFLUOROETHYLENE-ETHYLENE TYPE HAVING A CORE-SHELL PARTICLE STRUCTURE

The invention relates to an aqueous fluoropolymer dispersion comprising colloidal particles containing a melt-processable copolymer of tetrafluoroethylene (TFE), ethylene (E) and of, if desired, further fluoroolefinic comonomers and also a further melt-processable polymer, the copolymer powders obtained therefrom, a process for preparing such dispersions and the use of such copolymers.

Homopolymers and copolymers of TFE have high chemical resistance, heat resistance and good dielectric properties.

Such homopolymers and copolymers of TFE have also already been processed into porous shaped bodies and, in particular, into porous membranes by an entire series of methods.

It is thus known that polytetrafluoroethylene (PTFE), the homopolymer of TFE, can be provided with temporary pore formers which are then, after shaping is complete, dissolved out again or decompose during the subsequent sintering of the PTFE shaped body to form gaseous products and in this way leave behind a porous structure. GB-A-2 168 981 discloses mixing copolymers of TFE and E with a finely divided pulverulent inorganic material, for example calcium silicate or calcium carbonate, and also with a chlorotrifluoroethylene oligomer and, if desired, another heat-resistant organic substance, for example silicone oil. After shaping from the melt, the chlorotrifluoroethylene oligomer is first removed in a first extraction step and the pulverulent inorganic substance is then removed in a second extraction step.

Apart from the complicated process of the introduction and removal of the pore former, the disadvantage of this procedure is that it is hardly possible to remove the pore-forming substances without leaving a residue. Thus, contamination of the porous shaped article is unavoidable. In the case of a pore former which can be decomposed into gaseous products, decomposition residues can thus remain. In addition, in the case of melt-processable copolymers of TFE having lower melting points than PTFE, it is necessary to select pore formers having very low decomposition temperatures, since otherwise the copolymer melts when heated too strongly and the pore structure is lost. Naturally, the selection of such pore formers is very restricted.

Fine PTFE powders prepared from colloidal PTFE dispersions are known to be able to be converted into a porous fibril-knot structure if they are first extruded in the presence of a lubricant the extrudate thus obtained after removal of the lubricant is stretched at high stretch ratios and/or speeds and the porous articles obtained are sintered with fixing of their structure. This process is restricted to those TFE polymers which cannot be processed from the melt owing to their extremely high melt viscosity, i.e. PTFE itself and those TFE copolymers which contain only very small amounts of comonomers (<2% by weight). TFE copolymers having higher amounts of comonomers, which are processable from the melt, cannot be processed by such methods since their porous structure would be at least partially lost again by melting during fixing.

JP-A 79-158465 discloses a process in which charged particles from a nuclear reactor are fired at a film of a TFE/E copolymer, whereby a microporous structure is obtained. However, this structure is not made of curved or winding channels, corresponding to a three-dimensional network structure, but exclusively of straight pores going right through. Therefore, when used as a battery separator, it does not provide sufficient resistance to a cell short-circuit. U.S. Pat. No. 2 400 091 discloses a process in which porous articles are prepared by heating PTFE to the sintering temperature, comminuting it after cooling, shaping the powder obtained by pressure molding under increased pressure to give a porous article and strengthening this article by sintering again.

Such a process which allows simple control of the pore size and structure would also be very desirable for the production of porous structures of copolymers of TFE/E and, if desired, one or more additional comonomers, since these copolymers have, in comparison with PTFE, increased resistance to certain electrolytes and are therefore very suitable, in particular, as battery separators. However, this fails because, in the commercial copolymers of the TFE/E type, the pore structure formed is not reproducibly maintained during fixing under the action of heat.

It is therefore an object of the invention to provide a copolymer of the TFE/E type which can be shaped directly, if desired under pressure, to give a porous shaped article and whose pore structure is reliably retained in the subsequent thermal fixing.

The present invention achieves the above objective by providing fluoropolymers in the form of an aqueous dispersion of the type mentioned in the introduction. The invention accordingly provides an aqueous dispersion of colloidal particles of a melt-processable copolymer, comprising a) a particle core of a copolymer having units of from 32 to 60 mol % of tetrafluoroethylene, from 40 to 60 mol % of ethylene and from 0 to 8 mol % of at least one copolymerizable fluoroolefinic monomer, and also b) at least one particle shell of a melt-processable polymer having a melting point at least 20° C. lower than that of the copolymer of the particle core, where the volume of the particle shell(s) is from 1 to 26% by volume of the total volume of the particle. Preferred embodiments of the invention are described in detail below:

Copolymers of the TFE/E type, as make up the particle core a) are known, for example from U.S. Pat. No. 2 468 664, 3 624 250, 3 859 262, 3 960 825, 4 020 253, 4 123 602 and 4 381 387. Preferred copolymers contain the two main components TFE and E in a ratio of from 40:60 to 60:40 mol %. In addition, smaller proportions of at least one further fluoroolefinic comonomer can be present, which comonomer may improve certain properties of such a copolymer. Such comonomers are, for example, perfluoroolefins having from 3 to 8 carbon atoms, perfluoro(alkyl vinyl ethers) of the formula

where Rf1 is a perfluoroalkyl radical having from 1 to 5 carbon atoms and n can be from 0 to 3, or fluoroolefins of the formula

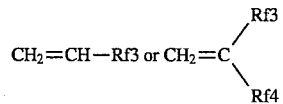

where Rf2 and Rf3 are each a perfluoroalkyl radical having from 1 to 8 carbon atoms and Rf4 is F or $CF_3$.

Representatives of these groups worthy of particular mention are hexafluoropropylene (HFP), perfluoro(propylvinyl ether), hexafluoroisobutylene and perfluorobutyl-ethylene. Further compounds which may be mentioned are trifluoroethylene, vinylidene fluoride, vinyl fluoride and chlorotrifluoroethylene. The copolymer can also comprise more than three of these comonomers. The type and proportion of these comonomers are advantageously to be selected in such a way that the melting point of the copolymer making up the particle core is $\geq 250°$ C. The proportion of these further comonomers is up to 8 mol %, preferably up to 6 mol %. The TFE content is thus at least 32 mol %.

Around this particle core there is arranged, preferably directly adjacent and enclosing, a particle shell which is preferably relatively thin with respect to the particle core. It comprises a melt-processable, preferably fluorine-containing, homopolymer or copolymer which has to, in particular, satisfy the condition that it has a melting point at least 20° C. lower than that of the copolymer of the TFE/E type making up the particle core.

The volume of the particle shell is from 1 to 26% by volume, preferably from 3 to 15% by volume, of the volume of the total particle comprising core and shell.

The melt-processable polymer making up the particle shell can be a homopolymer, for example polychlorotrifluoro-ethylene, polyvinylidene fluoride or polyvinyl fluoride. However, it can also be a melt-processable copolymer, for example a copolymer of TFE with chlorotrifluoroethylene or vinylidene fluoride, of TFE with HFP and vinylidene fluoride (insofar as they possess a crystallite melting point), a copolymer of chlorotrifluoroethylene with vinylidene fluoride and a copolymer of vinyl fluoride. In a preferred embodiment of the invention, the outer shell is formed of copolymers of the chlorotrifluoroethylene/E or, in particular, TFE/E type in which at least one additional comonomer is present in a proportion which is sufficiently high for the melting point to be lowered to the required region of at least 20° C. below the melting point of the polymer of the particle core. Such a preferred composition is that of a copolymer comprising from 20 to 30 mol % of TFE, from 40 to 60 mol % of E and from 10 to 30 tool% of HFP or from 10 to 30 mol% of a mixture of HFP and a further monomer such as perfluoro(propyl vinyl ether), chlorotrifluoroethylene, hexafluoroisobutylene or perfluorobutylethylene.

Even though a melting point difference of 20° C. between particle core and shell is sufficient, preference is nevertheless given to a particle shell whose melting point is lowered to a greater extent, for example is $\geq 50°$ C. lower than that of the particle core, because this makes possible a more unproblematical melting of the particles via their shells without the particle cores, which make up the major part, being changed. This gives a defined, so-to-say point-connected porous structure. It can be seen that the porosity can be controlled in a simple manner via the amount of the readily meltable particle shell as a proportion of the total particle.

The novel fluoropolymer dispersions of colloidal particles having a shell-core structure are prepared by the process, which is customary and known for fluoropolymers, of dispersion polymerization to give aqueous colloidal dispersions, with this process proceeding in two stages.

In both stages, the customary pressure and temperature conditions are used and the auxiliaries customary for the polymerization of fluoroolefins to give aqueous colloidal dispersions are added.

The polymerization is advantageously carried out in the aqueous phase at customary pressures of from 5 to 50 bar, preferably from 10 to 25 bar, and at temperatures of from −50° to +150° C., preferably from +20° to +100° C., in the presence of water-soluble, free-radical-forming initiators customary for the dispersion polymerization of fluoroolefins. These can be water-soluble, peroxidic compounds such as inorganic or organic peroxides, diacyl peroxides or per-acids including their water-soluble salts, for example perborates, percarbonates and, in particular, persulfates (preferably alkali metal or ammonium salts).

Furthermore, it is also possible to use water-soluble redox initiator systems, i.e. combinations of one of the specified peroxidic compounds and a reducing component, for example a water-soluble disulfite, thiosulfate, dithionite, hydrogen sulfite or sulfinate or else a diimine-supplying compound such as azodicarboxylic acid and salts thereof or azodicarboxamide.

Preferred initiators are the acids and salts of manganese, as are described in U.S. Pat No. 3 859 262. These are, in particular, the salts of manganese(VII) acid such as potassium permanganate, sodium permanganate, barium permanganate, magnesium permanganate; furthermore salts of manganese(VI) acid, the manganates, for example potassium manganate, ammonium manganate, sodium manganate and calcium manganate; further suitable salts are those of manganese(V) acid such as sodium hypomanganate ($Na_3MnO_4 \cdot 10H_2O$) and the salts of manganese(IV) acid, the manganites. The free acids themselves, insofar as they are stable in aqueous acid medium, can also be used as initiators, for example the crystalline dihydrate of permanganese acid ($HMnO_4 \cdot 2H_2O$). Similarly active catalysts are substances which are only transformed into the abovementioned compounds under the conditions of the polymerization, for example acid anhydrides such as manganese heptoxide ($Mn_2O_7$), also oxyhydrates, acid halides and other readily hydrolyzable relatively high-valence manganese compounds. Alkali metal permanganates and alkali metal manganates or the corresponding ammonium salts, in particular potassium permanganate and potassium manganate, are most advantageously used.

The amounts of initiator are within the customary range for the dispersion polymerization of fluoroolefins. They are from 0.00005 to 0.1% by weight, preferably from 0.0005 to 0.03% by weight, based on the aqueous polymerization medium, (by which is meant, in the case of redox systems, the oxidizing component). In the case of redox systems, use is advantageously also made of the known addition of small amounts of cocatalysts, for example of water-soluble salts of copper, iron or silver.

The polymerization is carried out in a customary manner in the pH range adhered to in the dispersion polymerization of fluoroolefins, which range depends on the type of initiator used and is in the region of from 3 to 9. Known buffer substances can be present.

Furthermore, for the dispersion polymerization to give colloidal dispersions of the process of the invention, use is made of emulsifiers as are usual and customary for the dispersion polymerization of fluoroolefins and as are described, for example, in U.S. Pat. No. 2 559 752. Examples which may be mentioned are the alkali metal and ammonium salts of relatively long-chain perfluorocarboxylic acids, ω-hydroperfluorocarboxylic acids, chlorofluorocarboxylic acids, perfluorodicarboxylic acids and also perfluorosulfonic acids and perfluorophosphonic acids. Such emulsifiers preferably have a carbon chain of from 6 to 12 carbon atoms. For the purposes of the process of the invention, preferred emulsifiers are the ammonium salts of ω-hydroperfluorooctanoic acid and, in particular, perfluorooctanoic acid. Salts of perfluoropropoxy-propionic acid may be mentioned as a further example of a class of effective emulsifiers. The emulsifiers specified can also, if desired, be used in the form of the free acids and be neutralized with ammonia. The emulsifiers used should be as telogenically inactive as possible.

The amounts of emulsifier are in the customary range for the dispersion polymerization of fluoroolefins. They are from about 0.02 to 0.5% by weight, preferably from about 0.05 to 0.4% by weight, based on the aqueous polymerization medium.

If desired, customary chain-transfer agents, for example acetone, methylene chloride or chloroform, can be added during the copolymerization to set certain melt viscosities which suit processing of the copolymers to be prepared.

In a preferred embodiment of the process of the invention, the copolymerization is carried out in the presence of the above-mentioned manganese compounds as initiators and a chain-transfer agent of the formula

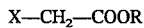

where X=Cl, Br, COOH, COOR', COCH$_3$, CH$_3$, C$_2$H$_5$ or C$_3$H$_7$ and R and R' are identical or different alkyl radicals having from 1 to 4 carbon atoms, as described in U.S. Pat. No. 4 338 237.

Preferred chain-transfer agents of the specified formula are the dimethyl ester, the methyl ethyl ester and, in particular, the diethyl ester of malonic acid.

For the purposes of the invention it is also possible to add mixtures of the specified chain-transfer agents.

It is furthermore advantageous for the copolymerization according to the process of the invention to be carried out in the presence of a dispersion-stabilizing, nonsurfactant compound of the formula

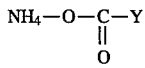

where Y=COONH$_4$, COOH, CH$_3$, CH$_2$OH, CH$_2$COOH or CH$_2$COONH$_4$, or a mixture of these compounds. Preferred, dispersion-stabilizing compounds are monoammonium and, in particular, diammonium oxalate. The specified stabilizing compounds can also be present as hydrates and it is to use mixtures of compounds selected from the group indicated. This too is described in U.S. Pat. No. 4 338 237.

The process of the invention for preparing the above-described aqueous fluoropolymer dispersions comprising colloidal particles having a shell-core structure comprises A) preparing a seed dispersion by copolymerization of TFE, E and, if desired, at least one further fluoroolefinic comonomer, and then B) continuing the polymerization in the presence of the seed dispersion A) by supplying monomers which form a polymer having a melting point at least 20° C. lower than that of the copolymer of stage A).

The copolymerization to obtain the colloidal seed dispersion in stage A) is continued until an aqueous seed dispersion having a solids content of from 6 to 20% by weight, preferably from 8 to 15% by weight, has been formed. The melting point of the polymer particles of this seed dispersion should preferably be ≧250° C. The seed dispersion prepared contains predominantly spherical, uniform sized polymer particles in the colloidal particle size range (mean diameter of from 0.01 to 1 µm, preferably from 0.05 to 0.5 µm).

In the process stage B), the polymerization is continued using this colloidal seed dispersion prepared according to stage A). This continuation can be carried out by initially charging the reaction vessel with the seed dispersion A) prepared in a separate operating step, with the amount of emulsifier and, if desired, of further polymerization auxiliaries required for the stage B) being added, advantageously in the form of aqueous solutions, prior to continuing the dispersion polymerization. After metering in the monomer(s) to be used, the polymerization is restarted by addition of the initiator. The addition of the polymerization ingredients can here, just as in stage A), also be carried out by initially charging a partial amount and later feeding the remaining amount required batchwise or continuously into the vessel via suitable feed lines during the course of the respective polymerization. Continuous addition during the entire polymerization process is likewise possible.

However, it is also possible to continue the dispersion polymerization of the stage A) by, after the latter is complete, carrying out a) an intermediate venting with substantial removal of the gas phase and metering in the monomer(s) required for the stage B) or b) a venting with only partial removal of the gas phase and supplementing the monomer(s) required for stage B) or c) a metering in of the monomer(s) required for the stage B) in the required ratios.

The dispersion polymerization is then, if required, restarted. The total amount of emulsifier and, if desired, other auxiliaries for the stage B) is here advantageously added at the beginning of the stage A). However, it is also possible, as described above, to feed the substances in later in partial amounts or continuously.

The copolymerization of the process stage B) is continued until the shell of the polymer particle formed reaches the desired proportion by volume, at most 26% by volume, of the total volume of the polymer particle. The volume enlargement of a polymer particle by at most 26% by volume of the total end volume reached gives an enlargement of the polymer particles by only at most 10.6% of the particle diameter.

The dispersion thus prepared comprises predominantly spherical, uniform sized polymer particles in the colloidal particle size range. It usually has a solids content of up to 25% by weight.

In the process of the invention, the formation of coagulated material is very small. Less than 1% by weight of coagulated material, based on the total amount of colloidally dispersed copolymer solid formed, is found.

The fluoropolymer dispersions of the invention having a core-shell structure can be freed of extraneous ions by means of ion exchangers and be concentrated by known processes, for example by evaporation in vacuo or by ultrafiltration, to give dispersions having a higher solids content up to 60% by weight.

The fluoropolymer dispersions of the invention can also be separated off or coagulated as powder from the dispersion by known processes, for example by action of mechanical shear forces or by addition of electrolytes. The powders resulting therefrom are made up of agglomerates of the above-described primary dispersion particles. These agglomerates (secondary particles) have a mean particle diameter of from 5 µm to 2 mm.

The porous secondary particles composed of primary particles of the dispersion and prepared in this manner can in turn, via the shells of the primary particles lying at the surface of the secondary particles, be joined to give a higher order porous structure, resulting in a porosity having small pores within the secondary particles and larger pores between the secondary particles.

However, in the coagulation it is somewhat difficult to achieve a narrow particle size distribution of the secondary particles. For this reason, a preferred method of separating the powder from the aqueous dispersion is spray drying which allows secondary particles having a predetermined mean particle size and a narrow particle size distribution to be produced in a targeted manner. The mean particle size can here be set within a wide size range. Preference is given to a mean particle size of from 1 to 100 µm, in particular from 5 to 50 µm, especially from 10 to 20 µm.

The further processing of the coagulated, dried powder or the spray-dried powder to give a porous planar article can, for example, be carried out by applying this powder in a loose bed or by spraying onto a support, for example a high-gloss metal surface or an aramid film. This support has to allow easy detachment of the shaped porous sheet and can be coated with materials which give an anti-adhesion effect and do not decompose at the sintering temperature.

The powder layer can also be further covered by an anti-adhesive sheet so that, if desired, light pressure can be applied from above. Sintering is then carried out in a furnace at a temperature above the melting point of the material of the particle shell, but below the melting point of the particle core, which takes a time of up to 1 hour, depending on layer thickness. In this process, a joining of the particles to give a three-dimensional network takes place by means of the melting of the particle shell. In a continuous manner, this process can be carried out on a conventional continuous sintering line. Finally, the porous layer thus formed is removed from the support.

The porous sheets thus produced can, besides the application already mentioned as battery separators, also be used as filter material in chemical processes, as membranes for dialysis, ultrafiltration, osmosis and drinking water treatment. However, compact shaped bodies such as, for example, porous tubes for filtration purposes can also be produced.

The porous articles thus produced have a three-dimensional network structure having a defined and controllable pore size, which has angular and curved pore passages. In their production there is no need for the addition of pore formers, the decomposition or removal of which usually leaves contamination. They have a high chemical resistance, in particular to chemicals that are used in battery electrolytes.

EXAMPLES 1 to 3

In the Examples 1 to 3, the following reaction conditions are employed:

An enamel polymerization reactor having a total volume of 16 l, fitted with a baffle and impeller stirrer is charged with 10 l of deionized water in which 40 g of diammonium oxalate monohydrate, 5 g of oxalic acid, 35 g of perfluorooctanoic acid and the amount indicated in Table 1 of diethyl malonate are dissolved. The polymerization reactor is first flushed with nitrogen and subsequently with TFE. The stirring speed is set to 320 rpm. It is then pressurized with TFE up to a pressure of 12.5 bar and subsequently with E up to a total monomer pressure of 17 bar. The polymerization is then started by pumping in a solution of potassium permanganate having a concentration of 0.5 g of $KMnO_4$ per 1 l of water. After the commencement of the polymerization, the feeding in of the potassium permanganate solution is regulated in such a way that a polymerization rate of from 20 to 100 g $l^{-1}$ $h^{-1}$ is achieved. The polymerization temperature is 40° C. and is kept constant using a heating/cooling medium via the heating/cooling jacket of the polymerization reactor. The polymerization heat evolved is thus compensated for. The total monomer pressure of 17 bar is automatically maintained by continuous feeding in of a TFE/E mixture in a molar ratio of 1:1. The reaction is first interrupted at the amount indicated in Table 1 of monomers fed in by ending the feed of the potassium permanganate solution and by venting the monomer mixture. To determine the mean particle size, a dispersion sample is taken (the values are given in Table 1).

After complete evacuation of the gas space, the reactor is again pressurized with TFE and E and additionally HFP in the amounts indicated in Table 1 up to a total monomer pressure of 17 bar. The polymerization is then again started and maintained by pumping in the potassium permanganate solution. The respective feed ratio of the monomers is given in Table 1. The reaction is interrupted at the amount indicated in Table 1 of monomers fed in by ending the feed of the potassium permanganate solution, by turning off the stirring, by venting the monomer mixture and cooling to room temperature. Coagulated material formed during the polymerization is separated off by filtration, and this is dried and weighed. The exact solids content of the filtered dispersion is determined by density measurement. The amount of potassium permanganate used, the polymerization time, the amount of aqueous dispersion, the polymer solids content, the mean particle size and the amount of coagulated material are given in Table 1.

To characterize the polymers obtained, the dispersion is coagulated by means of a high-speed stirrer. The polymer solid precipitated is separated from the mixture, washed a number of times with water, then dried at 120° C. in vacuo. The composition of the copolymers thus obtained and their first (lower) and second (upper) melting points corresponding to shell and core are given in Table 2.

TABLE 1

|  | Example No. | | |
| --- | --- | --- | --- |
|  | 1 | 2 | 3 |
| Amount of diethyl malonate [g] | 4 | 4 | 0 |
| Core |  |  |  |
| Termination at TFE [g] | 510 | 1000 | 1000 |
| Termination at E (g) | 120 | 247 | 249 |
| Addition of potassium permanganate [g] | 0.6 | 0.5 | 0.7 |
| Polymerization time [h] | 1.4 | 3 | 2 |
| Mean particle size [µm] | — | 0.09 | 0.1 |
| Shell |  |  |  |
| Pressurized with: |  |  |  |
| 1. HFP up to [bar] | 7.7 | 7.4 | 7.6 |
| 2. TFE up to [bar] | 14.7 | 14.6 | 10.2 |
| 3. E up to [bar] | 17.1 | 17.0 | 17.1 |
| Feed ratio mol of TFE:mol of E:mol of HFP | 1:1:0.5 | 1:1:0.5 | 1:1:1 |
| Termination at |  |  |  |
| TFE [g] | 103 | 102 | 52 |
| E [g] | 23 | 23 | 12.5 |
| HFP [g] | 55 | 88 | 134 |
| Addition of potassium permanganate [g] | 0.24 | 0.175 | 0.19 |
| Polymerization time [h] | 0.5 | 0.4 | 0.35 |
| Aqueous dispersion obtained [kg] | 12.6 | 14.5 | 13.1 |
| Polymer solids content [wt. %] | 7.8 | 10.1 | 12.0 |
| Mean particle size [µm] | 0.06 | 0.08 | 0.12 |
| Formation of coagulated material [g] | <1 | 1 | <1 |

TABLE 2

|  | Example No. | | |
| --- | --- | --- | --- |
|  | 1 | 2 | 3 |
| Weight ratio core: shell | 1:0.2 | 1:0.1 | 1:0.05 |
| Composition of the total particle: | | | |
| TFE [mol %] | 49.2 | 48.6 | 48.8 |
| E [mol %] | 49.3 | 50.6 | 50.6 |
| HFP [mol %] | 1.5 | 0.8 | 0.6 |
| Composition of the shell: | | | |
| TFE [mol %] | 46.2 | 45.3 | 44.3 |
| E [mol %] | 46.3 | 47.3 | 46.0 |
| HFP [mol %] | 7.5 | 7.4 | 9.7 |
| Lower melting point according to DSC [°C.] | 134 | 184 | 145 |
| Upper melting point according to DSC [°C.] | 282 | 280 | 283 |

EXAMPLE 4

A dispersion as described in Examples 1 to 3 is spray dried using a rotary disc atomizer at a disc rotation rate of 50,000 $\min^{31}$ and a circumferential speed of 157 m/s and a gas volume flow of 110 m³/h. The further parameters and the results are shown in Table 3.

The residual moisture was determined by drying for seven hours in a drying oven (at 200° C. and 10 mbar) and the particle size was determined using a CILAS granulometer (dispersed in aqueous surfactant solution using ultrasound).

TABLE 3

|  | Dispersion according to Example No. | | | | | | | | |
| --- | --- | --- | --- | --- | --- | --- | --- | --- | --- |
|  | 2 | 2 | 2 | 2 | 2 | 2 | 3 | 3 | 3 |
| Gas temperature [°C.]: | | | | | | | | | |
| Dryer inlet | 140 | 270 | 180 | 140 | 270 | 180 | 140 | 270 | 175 |
| Dryer outlet | 90 | 147 | 100 | 70 | 143 | 100 | 70 | 147 | 100 |
| Feed [kg/h] | 2.6 | 2.5 | 4.5 | 1.7 | 4 | 5.3 | 1.7 | 3.5 | 4.8 |
| Time of experiment [min] | 60 | 60 | 95 | 60 | 60 | 117 | 65 | 65 | 105 |
| Residual moisture [%]: | | | | | | | | | |
| Feed | 87.5 | 87.5 | 87.5 | 89.9 | 89.9 | 89.9 | 88 | 88 | 88 |
| Dry product | 0.62 | 0.7 | 7.5 | 6.39 | 0.64 | 0.68 | 9.51 | 1.81 | 0.63 |
| Agglomerate size [μm]: | | | | | | | | | |
| d10 | 8.5 | 10.2 | 7.9 | 5.8 | 9.1 | 5.9 | 5.5 | 9.7 | 8.2 |
| d50 | 13.7 | 18.3 | 16.4 | 18.2 | 35.8 | 20.2 | 16.1 | 32.2 | 15.1 |
| d90 | 19.9 | 29 | 28.7 | 42.1 | 79.6 | 45.1 | 35.5 | 56.4 | 24.9 |

The parameters given in the examples are determined by the following measurement methods:

1. Mean particle size of the primary particles:

The dispersion, greatly diluted with water, is applied to a copper mesh and dried. An electron micrograph is taken at an enlargement by a factor of 17,000, namely on an ELM-ISKOP II from Siemens. The micrograph is enlarged again by a factor of 4.25. The resulting picture is then counted according to particle size using a particle size counter from Zeiss (model TGZ 3). The mean particle diameter is calculated from the resulting distribution curve.

2. Copolymer composition:

To determine the copolymer composition, the fluorine content is first determined by combustion of the copolymer powder obtained from the dispersion in a Wickbold apparatus and subsequent calorimetric fluoride titration using thorium nitrate. In addition, the molar ratio of tetrafluoroethylene and hexafluoropropylene can be determined from the $^{19}$F-NMR of the polymer powder mixed with diethyl adipate and heated to from 200 to 250° C., measured on a nuclear resonance spectrometer MSL 300 from Bruker.

The composition of the total particles can be calculated from the combination of fluorine content and TFE/HFP ratio.

To determine the copolymer composition of the outer shell, the analytical results of particle cores polymerized in the same way (without outer modified shell) are compared with those of core-shell particles.

3. Melting points:

The melting points of core and shell are measured using a differential scanning calorimeter DSC-4 from Perkin Elmer.

I claim:

1. An aqueous dispersion of colloidal particles of a melt-processable copolymer, comprising
   a) a particle core of a copolymer having units of from 32 to 60 mol % of tetrafluoroethylene, from 40 to 60 mol % of ethylene and from 0 to 8 mol % of at least one copolymeriz-able fluoroolefinic monomer, and also
   b) at least one particle shell of a melt-processable polymer having a melting point at least 20° C. lower than that of the copolymer of the particle core,
   where the volume of the particle shell(s) is from 1 to 26% by volume of the total volume of the particle.

2. A dispersion as claimed in claim 1, wherein the copolymer making up the particle core has a melting point of ≧250° C.

3. A dispersion as claimed in claim 1, wherein the copolymer making up the particle core comprises from 60 to 40 mol % of copolymerized units of tetrafluoro-ethylene and from 40 to 60 mol % of copolymerized units of ethylene.

4. A dispersion as claimed in claim 1, where copolymerizable fluoroolefinic monomer is a perfluoroolefin having from 3 to 8 carbon a perfluoro(alkyl vinyl ether) of the formula

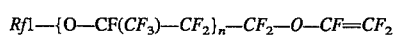

wherein Rf1 is a perfluoroalkyl radical having from 1 to 5 carbon atoms and n is from 0 to 3, or a fluoroolefin of the formula

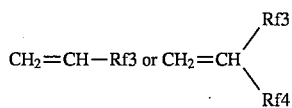

where Rf3 is a perfluoroalkyl radical having from 1 to 8 carbon atoms and Rf4 is F or $CF_3$.

5. A dispersion as claimed in claim 1, wherein the polymer making up the particle shell is a copolymer comprising copolymerized units of tetrafluoro-ethylene, of ethylene and at least one further fluorine-containing comonomer.

6. A dispersion as claimed in claim 5, wherein the copolymer comprises from 20 to 30 mol % of copolymerized units of tetrafluoroethylene, from 40 to 60 mol % of ethylene and from 10 to 30 mol % of hexafluoropropene.

7. A coagulated powder of a fluoropolymer as claimed in claim 1, whose coagulated secondary particles have a mean particle size of from 5 µm to 2 mm.

8. A spray-dried powder of a fluoropolymer as claimed in claim 1, wherein the secondary particles obtained by spray drying have a mean particle size of from 1 to 100 µm.

9. A process for preparing a dispersion as claimed in claim 1, which comprises first A) preparing a seed dispersion by copolymerization of tetrafluoroethylene, ethylene and, if desired, further fluoroolefinic comonomers, and then B) continuing the polymerization in the presence of the seed dispersion A) by supplying the monomers for the particle shell, where the particle shell is a polymer having a melting point at least 20° C. lower than that of the copolymer of stage A), where the volume of the particle shell(s) is from 1 to 26% by volume of the total volume of the colloidal particle.

10. A porous structure prepared from a powder as claimed in claim 7.

11. A porous structure prepared from a powder as claimed in claim 8.

* * * * *

UNITED STATES PATENT AND TRADEMARK OFFICE
CERTIFICATE OF CORRECTION

PATENT NO. : 5,506,281
DATED : April 9, 1996
INVENTOR(S) : Muhlbauer

It is certified that error appears in the above-indentified patent and that said Letters Patent is hereby corrected as shown below:

In claim 1, at column 10, line 25, the phrase "copolymeriz-able" should read --copolymerizable--.

In claim 3, at column 10, line 58, the phrase "tetrafluoro-ethylene" should read --tetrafluoroethylene--.

In claim 4, at column 10, line 60, the word "where" should read --wherein the--.

In claim 4, at column 10, line 62, after the word "carbon", insert --atoms,--.

In claim 5, at column 11, line 12, the phrase "tetrafluoro-ethylene" should read --tetrafluoroethylene--.

Signed and Sealed this

Twenty-sixth Day of November 1996

Attest:

BRUCE LEHMAN

*Attesting Officer*    *Commissioner of Patents and Trademarks*